(12) United States Patent
Kim et al.

(10) Patent No.: US 10,460,210 B1
(45) Date of Patent: *Oct. 29, 2019

(54) METHOD AND DEVICE OF NEURAL NETWORK OPERATIONS USING A GRID GENERATOR FOR CONVERTING MODES ACCORDING TO CLASSES OF AREAS TO SATISFY LEVEL 4 OF AUTONOMOUS VEHICLES

(71) Applicant: Stradvision, Inc., Pohang, Gyeongbuk (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/253,996

(22) Filed: Jan. 22, 2019

(51) Int. Cl.
*G06K 9/00* (2006.01)
*G06K 9/62* (2006.01)
(Continued)

(52) U.S. Cl.
CPC ....... *G06K 9/6262* (2013.01); *G06K 9/00791* (2013.01); *G06K 9/6257* (2013.01);
(Continued)

(58) Field of Classification Search
CPC ............ G06K 9/6262; G06K 9/00791; G06K 9/6257; G06K 9/6261; G06N 3/08; G06Y 7/70; G06Y 2207/20021; G06Y 2207/20081; G06Y 2207/20084; G06Y 2207/30252
See application file for complete search history.

(56) References Cited

U.S. PATENT DOCUMENTS

| | | | |
|---|---|---|---|
| 5,640,468 A * | 6/1997 | Hsu | G06K 9/00201 382/190 |
| 7,398,259 B2 * | 7/2008 | Nugent | G06N 3/08 706/33 |
| 9,576,201 B2 * | 2/2017 | Wu | G06K 9/00664 |

* cited by examiner

*Primary Examiner* — Ping Y Hsieh
(74) *Attorney, Agent, or Firm* — Xsensus, LLP

(57) ABSTRACT

A method of neural network operations by using a grid generator is provided for converting modes according to classes of areas to satisfy level 4 of autonomous vehicles. The method includes steps of: (a) a computing device, if a test image is acquired, instructing a non-object detector to acquire non-object location information for testing and class information of the non-objects for testing by detecting the non-objects for testing on the test image; (b) the computing device instructing the grid generator to generate section information by referring to the non-object location information for testing; (c) the computing device instructing a neural network to determine parameters for testing; (d) the computing device instructing the neural network to apply the neural network operations to the test image by using each of the parameters for testing, to thereby generate one or more neural network outputs.

20 Claims, 5 Drawing Sheets

(51) Int. Cl.
*G06N 3/08* (2006.01)
*G06T 7/70* (2017.01)

(52) U.S. Cl.
CPC .............. *G06K 9/6261* (2013.01); *G06N 3/08* (2013.01); *G06T 7/70* (2017.01); *G06T 2207/20021* (2013.01); *G06T 2207/20081* (2013.01); *G06T 2207/20084* (2013.01); *G06T 2207/30252* (2013.01)

METHOD AND DEVICE OF NEURAL NETWORK OPERATIONS USING A GRID GENERATOR FOR CONVERTING MODES ACCORDING TO CLASSES OF AREAS TO SATISFY LEVEL 4 OF AUTONOMOUS VEHICLES

FIELD OF THE DISCLOSURE

The present disclosure relates to a method of neural network operations using a grid generator for converting modes according to classes of areas in a test image, to satisfy level 4 of autonomous vehicles; and more particularly, the method for the neural network operations by using the grid generator, including steps of: (a) if the test image is acquired, instructing a non-object detector to acquire non-object location information for testing, including information on where non-objects for testing are located on the test image, and class information of the non-objects for testing, including information on classes of the non-objects for testing, by detecting the non-objects for testing on the test image; (b) instructing the grid generator to generate section information, which includes information on a plurality of subsections in the test image, by referring to the non-object location information for testing; (c) instructing a neural network to determine parameters for testing, to be used for applying the neural network operations to either (i) at least part of the subsections including each of the objects for testing and each of non-objects for testing corresponding to said each of the objects for testing, or (ii) each of sub-regions, in each of said at least part of the subsections, where said each of the non-objects for testing is located, by referring to parameters for training which have been learned by using information on non-objects for training whose corresponding class information is same as or similar to that of the non-objects for testing; and (d) instructing the neural network to apply the neural network operations to the test image by using each of the parameters for testing, corresponding to each of said at least part of the subsections, to thereby generate one or more neural network outputs, and a computing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of the machine learning.

Meanwhile, also in the field of autonomous driving, the CNN is used widely. In autonomous driving circumstances, most of input images have a similar typical arrangement, mainly including roads in the centers of the input images and sidewalks in both sides of the input images. Thus, CNN for the autonomous driving may learn parameters by using training images with the typical arrangement, e.g., composition.

However, learning process as shown above has a critical shortcoming. That is, in case arrangements of the input images are not similar to those of the training images, CNN operations may be inefficient. For example, when rounding a corner, a road may not exist in the center of a test image, different from the training images with the typical arrangement. Because parameters of the CNN are optimized for the input images with the roads located in centers thereof, the test image may not be processed properly with the above-mentioned parameters.

SUMMARY OF THE DISCLOSURE

It is an object of the present disclosure to solve all the aforementioned problems.

It is another object of the present disclosure to provide a method for determining parameters for testing by referring to class information of one or more non-objects for testing included in each of at least part of subsections, to thereby generate optimized neural network outputs.

In accordance with one aspect of the present disclosure, there is provided a method for neural network operations by using a grid generator, including steps of: (a) a computing device, if a test image is acquired, instructing a non-object detector to acquire non-object location information for testing, including information on where non-objects for testing are located on the test image, and class information of the non-objects for testing, including information on classes of the non-objects for testing, by detecting the non-objects for testing on the test image; (b) the computing device instructing the grid generator to generate section information, which includes information on a plurality of subsections in the test image, by referring to the non-object location information for testing; (c) the computing device instructing a neural network to determine parameters for testing, to be used for applying the neural network operations to either (i) at least part of the subsections including each of the objects for testing and each of non-objects for testing corresponding to said each of the objects for testing, or (ii) each of sub-regions, in each of said at least part of the subsections, where said each of the non-objects for testing is located, by referring to parameters for training which have been learned by using information on non-objects for training whose corresponding class information is same as or similar to that of the non-objects for testing; (d) the computing device instructing the neural network to apply the neural network operations to the test image by using each of the parameters for testing, corresponding to each of said at least part of the subsections, to thereby generate one or more neural network outputs.

As one example, at the step of (b), the grid generator divides the test image by using a dynamic template, and wherein the dynamic template is provided by adjusting one or more boundaries included therein, such that at least one of the non-objects for testing is included in each of said at least part of the subsections of the dynamic template.

As one example, the grid generator manages information on the dynamic template, and wherein the dynamic template includes at least part of (i) at least one first boundary in a first direction and (ii) at least one second boundary in a second direction, some of which are adjustable.

As one example, the dynamic template includes row groups and one or more column groups, wherein the row groups have an upper row group, a middle row group including at least part of the column groups, and a lower row group, and wherein at least one of the non-objects for testing is included in each of said at least part of the subsections formed by the row groups and the column groups.

As one example, before the step (a), the method further includes a step of: (a0) the computing device instructing the neural network to learn the parameters for training by using information on each of the non-objects for training included in one or more training images.

As one example, at the step of (a0), the neural network learns the parameters for training by using information on each of the non-objects for training included in each of at least part of partial areas, from a first partial area to a k-th partial area, included in the training images, and store class information of the non-objects for training coupled with their corresponding parameters for training.

As one example, on condition that there are first location information to k-th location information corresponding to the first partial area to the k-th partial area in each of the training images, the training images, in which respective relative variations of at least part of the first location information to the k-th location information are equal to or smaller than a predetermined threshold value, are selected.

As one example, at the step of (c), (i) on condition that a ratio of an area of a specific object for testing to a specific subsection including the specific object for testing is smaller than a predetermined threshold value, the computing device instructs the neural network to determine at least one specific parameter for testing among the parameters for testing, to be used for applying the neural network operations to the specific subsection, by referring to at least one specific parameter for training among the parameters for training and (ii) on condition that the ratio of that is the same as or larger than the predetermined threshold value, the computing device instructs the neural network (ii-1) to determine a first part of the specific parameter for testing, to be used for applying the neural network operations to a sub-region, in the specific subsection, where a specific non-object for testing is located, by referring to the specific parameter for training among the parameters for training and (ii-2) to determine a second part of the specific parameter for testing, to be used for applying the neural network operations to a sub-region, in the specific subsection, where the specific object for testing is located, by referring to at least one additional parameter for training having been separately learned by using additional objects for training whose corresponding class information is the same as or similar to that of the specific object for testing.

As one example, at the step of (d), the computing device instructs the neural network to generate the neural network outputs by applying one or more convolutional operations and one or more deconvolutional operations to the test image with the parameters for testing.

As one example the test image represents road driving circumstances, the objects for testing represent objects existing on a road, and the neural network outputs are used for autonomous driving.

In accordance with another aspect of the present disclosure, there is provided a computing device for neural network operations by using a grid generator, including: at least one memory that stores instructions; and at least one processor configured to execute the instructions to: perform processes of: (I) instructing a non-object detector to acquire non-object location information for testing, including information on where non-objects for testing are located on a test image, and class information of the non-objects for testing, including information on classes of the non-objects for testing, by detecting the non-objects for testing on the test image, (II) instructing the grid generator to generate section information, which includes information on a plurality of subsections in the test image, by referring to the non-object location information for testing, (III) instructing a neural network to determine parameters for testing, to be used for applying the neural network operations to either (i) at least part of the subsections including each of the objects for testing and each of non-objects for testing corresponding to said each of the objects for testing, or (ii) each of sub-regions, in each of said at least part of the subsections, where said each of the non-objects for testing is located, by referring to parameters for training which have been learned by using information on non-objects for training whose corresponding class information is same as or similar to that of the non-objects for testing, and (IV) instructing the neural network to apply the neural network operations to the test image by using each of the parameters for testing, corresponding to each of said at least part of the subsections, to thereby generate one or more neural network outputs.

As one example, at the process of (II), the grid generator divides the test image by using a dynamic template, and wherein the dynamic template is provided by adjusting one or more boundaries included therein, such that at least one of the non-objects for testing is included in each of said at least part of the subsections of the dynamic template.

As one example, the grid generator manages information on the dynamic template, and wherein the dynamic template includes at least part of (i) at least one first boundary in a first direction and (ii) at least one second boundary in a second direction, some of which are adjustable.

As one example, the dynamic template includes row groups and one or more column groups, wherein the row groups have an upper row group, a middle row group including at least part of the column groups, and a lower row group, and wherein at least one of the non-objects for testing is included in each of said at least part of the subsections formed by the row groups and the column groups.

As one example, before the process of (I), the processor further performs a process of: (0) instructing the neural network to learn the parameters for training by using information on each of the non-objects for training included in one or more training images.

As one example, at the process of (0), the neural network learns the parameters for training by using information on each of the non-objects for training included in each of at least part of partial areas, from a first partial area to a k-th partial area, included in the training images, and store class information of the non-objects for training coupled with their corresponding parameters for training.

As one example, on condition that there are first location information to k-th location information corresponding to the first partial area to the k-th partial area in each of the training images, the training images, in which respective relative variations of at least part of the first location information to the k-th location information are equal to or smaller than a predetermined threshold value, are selected.

As one example, at the process of (III), (i) on condition that a ratio of an area of a specific object for testing to a specific subsection including the specific object for testing is smaller than a predetermined threshold value, the processor instructs the neural network to determine at least one specific parameter for testing among the parameters for testing, to be used for applying the neural network operations to the specific subsection, by referring to at least one specific parameter for training among the parameters for training and (ii) on condition that the ratio of that is the same as or larger than the predetermined threshold value, the processor instructs the neural network (ii-1) to determine a first part of the specific parameter for testing, to be used for applying the neural network operations to a sub-region, in the specific subsection, where a specific non-object for testing is located, by referring to the specific parameter for training among the parameters for training and (ii-2) to determine a second part of the specific parameter for testing, to be used for applying the neural network operations to a sub-region, in the specific subsection, where the specific object for testing is located, by referring to at least one additional parameter for training having been separately learned by using additional objects for training whose corresponding class information is the same as or similar to that of the specific object for testing.

As one example, at the process of (IV), the processor instructs the neural network to generate the neural network outputs by applying one or more convolutional operations and one or more deconvolutional operations to the test image with the parameters for testing.

As one example, the test image represents road driving circumstances, the objects for testing represent objects existing on a road, and the neural network outputs are used for autonomous driving.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
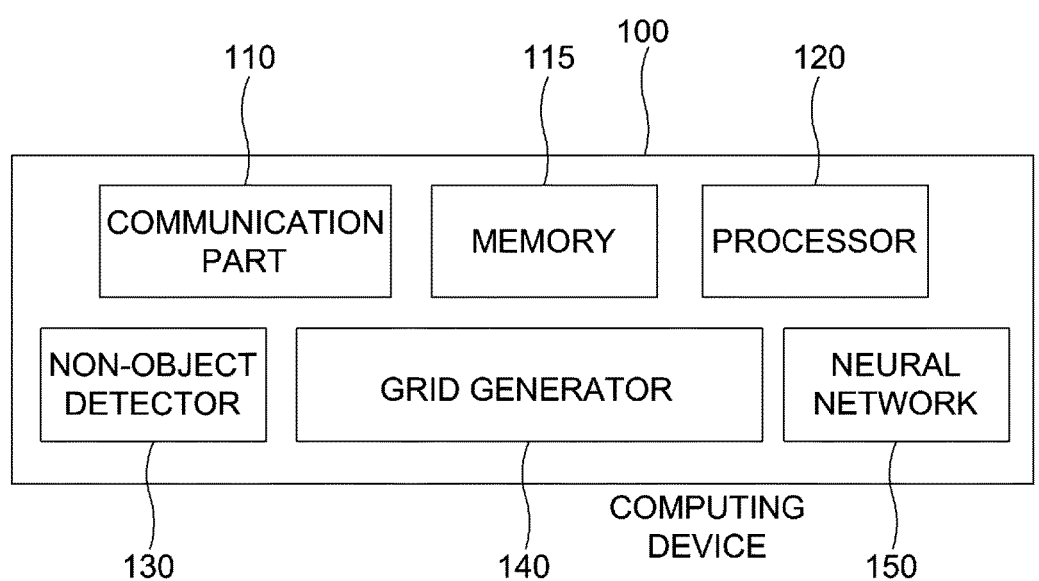
FIG. 1 shows a configuration of a computing device for performing a method of neural network operations using a grid generator in accordance with the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

For reference, in the description below, the phrase "for training" is added for terms related to learning processes, and the phrase "for testing" is added for terms related to testing processes, to avoid possible confusion.

FIG. 1 shows a configuration of the computing device for performing a method of neural network operations using a grid generator in accordance with the present disclosure.

By referring to FIG. 1, the computing device 100 may include a non-object detector 130, a grid generator 140, and a neural network 150. Functions of inputting and outputting various data and those of operating the various data of the non-object detector 130, the grid generator 140, and the neural network 150 may be performed by a communication part 110 and a processor 120 therein respectively. But, in FIG. 1, detailed explanation on how the communication part 110 and the processor 120 are connected is omitted. In addition, the computing device may further include a memory 115 capable of storing computer readable instructions for performing following processes. As one example, the processor, the memory, a medium, etc. may be integrated with an integrated processor.

Above the configuration of the computing device 100 was explained. Below, the process for generating neural network outputs by using the grid generator 140 in accordance with the present disclosure will be explained.

Figure 2:
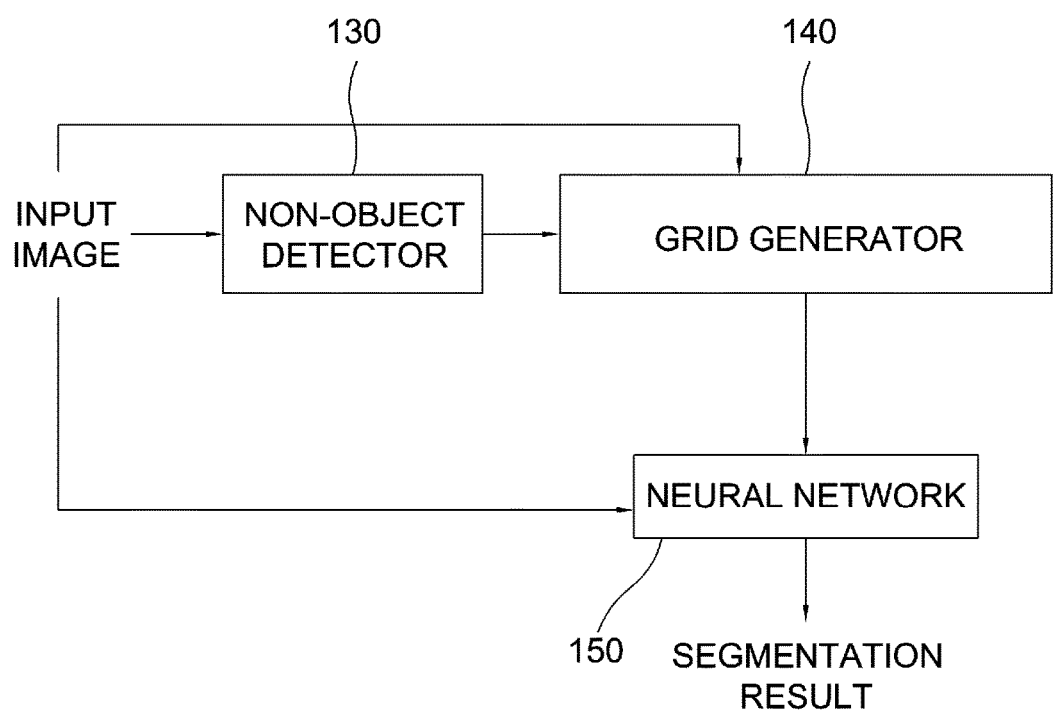
FIG. 2 shows processes for generating neural network outputs in accordance with the present disclosure.

FIG. 2 shows processes for generating the neural network outputs in accordance with the present disclosure.

By referring to FIG. 2, it can be seen that if a test image is acquired, processes may be performed by the non-object detector 130, the grid generator 140, and the neural network 150 in the order thereof. To the non-object detector 130, the test image may be inputted. And, to the grid generator 140, the test image and non-object location information for testing generated by the non-object detector 130 may be inputted. Finally, to the neural network 150, the test image, section information generated by the grid generator 140, and class information of non-objects for testing, including information on classes of the non-objects for testing, generated by the non-object detector 130 may be inputted. Then, the neural network 150 may generate the neural network outputs by referring to the test image and parameters for testing determined by referring to the section information and the class information of the non-objects for testing.

Specifically, if the test image representing road driving circumstances is acquired by the communication part 110, the computing device 100 may instruct the non-object detector 130 to acquire the non-object location information for testing, including information on where non-objects for testing in the test image are located, and the class information of the non-objects for testing by detecting the non-objects for testing on the test image.

After the non-object location information for testing and the class information of the non-objects for testing are acquired by the non-object detector 130, the computing device 100 may instruct the grid generator 140 to divide the test image into a plurality of subsections, and generate the section information, which includes information on the subsections for testing in the test image, by referring to the non-object location information for testing. In some of the subsections, objects for testing and their corresponding non-objects for testing may exist together, e.g., a car (as an object for testing) and a road (as a non-object for testing).

Herein, the grid generator 140 may divide the test image into the subsections by using a dynamic template.

Specifically, the grid generator 140 may manage information on the dynamic template, and the dynamic template may include at least part of (i) at least one first boundary in a first direction and (ii) at least one second boundary in a second direction, some of which are adjustable.

As one example, the first direction may be parallel to a horizontal axis of the test image and the second direction may be parallel to a vertical axis of the test image, but it may not be limited to these. Further, the first direction and the second direction may be diagonal directions or even curves determined by specific functions.

Otherwise, the dynamic template may include row groups and one or more column groups. As one example, the row groups may have an upper row group, a middle row group including at least part of the column groups, and a lower row group. The reason why the middle row group may include at least part of the column groups is that many important objects and non-objects exist generally in the center of the test image.

The configuration of the dynamic template may be predetermined as shown above. Herein, when the grid generator 140 divides the test image by using the dynamic template, the dynamic template may be provided by adjusting one or more boundaries included therein. As one example, the dynamic template may be provided such that at least one of the non-objects for testing is included in each of said at least part of the subsections thereof. The section information may include information on locations of the adjusted boundaries.

After the section information is generated as shown above, the computing device 100 may instruct the neural network 150 to determine the parameters for testing by using the section information and the class information of the non-objects for testing.

In order to explain processes of determining the parameters for testing, processes of learning parameters for training of the neural network will be explained.

Before the test image is acquired by the communication part 110, the computing device 100 may have instructed the neural network 150 to learn the parameters for training by using information on each of non-objects for training included in one or more training images. Each of the training images may include a typical arrangement which may appear in road driving circumstance. In order to explain the typical arrangement, FIG. 3 will be referred to.

Figure 3:
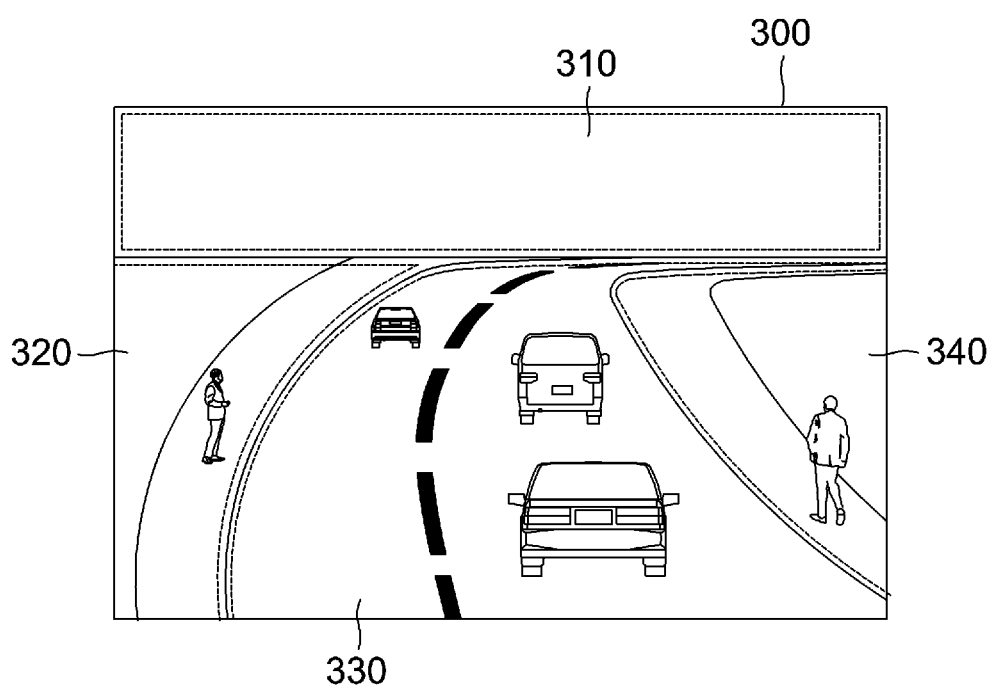
FIG. 3 shows a training image with a typical arrangement to be used for learning parameters of the neural network in accordance with the present disclosure.

FIG. 3 shows an example training image with the typical arrangement which have been used for learning the parameters for training of the neural network in accordance with the present disclosure.

By referring to FIG. 3, it can be seen that a road part is located in a center of the example training image 300, sidewalk parts are located in both sides thereof, and a sky part is located in an upper side thereof. The training images which have been used for learning parameters of the neural network 150 may be similar to the example training image 300.

In order to explain a configuration of the example training image 300, terms of partial area and location information for training will be explained.

The partial areas may be areas where the non-objects for training is located. For example, each of the partial areas may be each of areas in which each of the road part, the sidewalk parts, and the sky part is located. The location information for training may include coordinates of centers of the partial areas.

Herein, on condition that there are first location information to k-th location information corresponding to the first partial area to the k-th partial area in each of the training images, the training images, in which respective relative variations of at least part of the first location information to the k-th location information are equal to or smaller than a predetermined threshold value, may be selected to be used for the process of learning.

In the process of learning, the neural network 150 may not have learned the parameters for training by using entire area included in each of the training images. Rather, the neural network 150 may have learned the parameters for training by using information on each of the non-objects for training included in each of at least part of partial areas, from a first partial area to a k-th partial area, included in the training images, and have stored class information of the non-objects for training coupled with their corresponding parameters for training.

For example, assume that the neural network 150 has learned the parameters for training by using a plurality of training images such as the example training image shown in FIG. 3. In this case, a first partial area 310 may be the sky part, a second partial area 320 may be a left sidewalk part, a third partial area 330 may be a road part, and a fourth partial area 340 may be a right sidewalk part. Herein, the neural network 150 may have learned parameters for training corresponding to the sky part by using the first partial area 310 and store class information of the sky part coupled with the parameters for the sky part. Similarly, in case of determining some part of the parameters for training corresponding to the sidewalk parts, the second partial area 320 and the fourth partial area 340 may have been used, and class information of the sidewalk parts may have been stored.

Above the learning process of the neural network 150 was explained. Below the process of determining the parameters for testing will be explained.

After the learning process of the neural network 150 has been completed, the parameters for training and the class information of their corresponding non-objects may be stored. Then, if the test image is acquired by the communication part 110 and the processes performed by the non-object detector 130 and the grid generator 140 are completed, the computing device 100 may instruct the neural network 150 to determine the parameters for testing by referring to parameters for training which have been learned by using the information on non-objects for training whose corresponding class information is same as or similar to that of the non-objects for testing.

Herein, the parameters for testing may be used for applying the neural network operations to either (i) said at least part of the subsections including each of the objects for testing and each of non-objects for testing corresponding to said each of the objects for testing, or (ii) each of sub-regions, in each of said at least part of the subsections, where said each of the non-objects for testing is located. If the parameters for testing are applied only to the sub-regions shown above, at least one additional parameter for testing, to be applied to each of regions where said each of the objects for testing is located, is determined by referring to additional parameters for training, which have been learned separately by using additional objects for training whose corresponding class information is the same as or similar to that of the object for testing.

For this process, the neural network 150 may use the class information of each of the non-objects for testing, acquired by the non-object detector 130, included in each of said at least part of the subsections.

For example, assume that specific parameters for training corresponding to the road part and the class information of the road part are stored together. In this case, if the road is determined to exist in a specific subsection in the test image, the specific parameters for testing are determined by using specific parameters for training corresponding to the specific subsection.

This method can be effective comparing to a conventional method in that it can apply proper parameters for testing even in case relative locations of the components included in the test image are different from those in the training image.

Specifically, the present disclosure may be most effective if the difference between the first location information to the k-th location information corresponding to a first partial area to a k-th partial area of the training image and those of the test image is larger than a second threshold value, but it may not be limited to this.

Figure 4A:
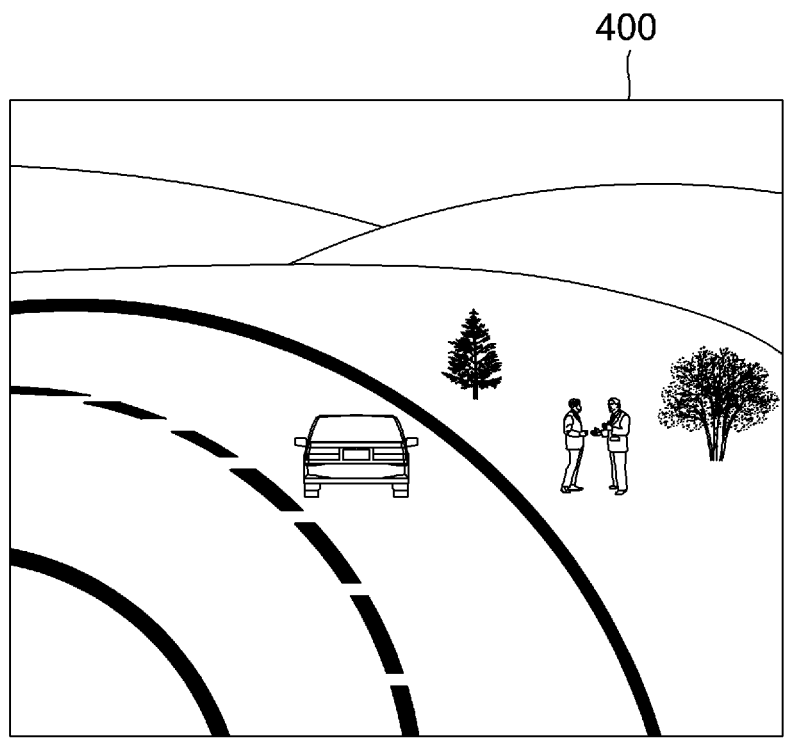
FIG. 4A shows a test image to which the method of neural network operation using the grid generator can be applied efficiently in accordance with the present disclosure.

FIG. 4A shows an example test image to which the method of the neural network operations using the grid generator can be applied efficiently in accordance with the present disclosure.

By referring to FIG. 4A, it can be seen that the road part is located on the left side, and the sidewalk part is located on the right side unlike FIG. 3. In this case, a result of the neural network operations generated by conventional methods may not be optimized. Because location of the road part included in the test image and that included in the training image are different. Thus, the parameters for testing may not be optimized. However, if the method of the present disclosure is applied to the test image corresponding to the case as shown above, optimized parameters can be applied to each of said at least part of the subsections, so that optimized result of the neural network operations can be generated. It is shown in FIG. 4B.

Figure 4B:
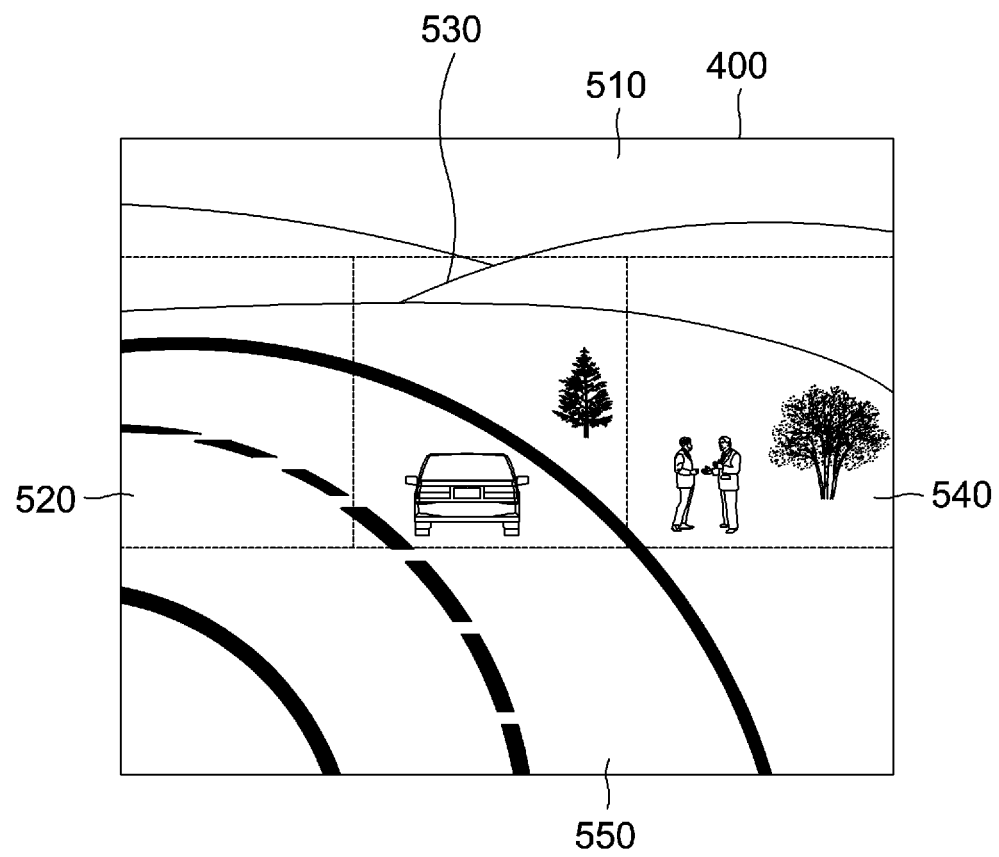
FIG. 4B shows a test image with subsections generated by a dynamic template in accordance with the present disclosure.

FIG. 4B shows an example test image with the subsections generated by the dynamic template in accordance with the present disclosure.

By referring to FIG. 4B, it can be seen that subsections 520, 530, 550 for the road part on a left of the middle row, a center of the middle row, and the lower row, and a subsection 540 for the sidewalk part on a right side of the middle row are provided. Owing to the subsections, the parameters for training having been learned by using the road part included in the training image can be applied to the subsections 520, 530, and 550, and those having been learned by using the sidewalk part included in the training image can be applied to the subsection 540.

Meanwhile, the parameters for testing can be determined by further referring to a ratio of an area of a specific object for testing to a specific subsection including the specific object for testing.

Specifically, on condition that the ratio of the area of the specific object for testing to the specific subsection including the specific object for testing is smaller than a predetermined threshold value, the computing device 100 may instruct the neural network 150 to determine at least one specific parameter for testing among the parameters for testing, to be used for applying the neural network operations to the specific subsection, by referring to at least one specific parameter for training among the parameters for testing.

On the contrary, on condition that the ratio of that is same as or larger than the predetermined threshold value, the computing device 100 may instruct the neural network 150 to determine a first part of the specific parameter for testing, to be used for applying the neural network operations to a sub-region, in the specific subsection, where a specific non-object for testing is located, by referring to the specific parameter for training among the parameters for training, and to determine a second part of the specific parameter for testing, to be used for applying the neural network operations to a sub-region, in the subsection, where the specific object for testing is located, by referring to the at least one additional parameter for training having been separately learned by using additional objects for training whose corresponding class information is the same as or similar to that of the specific object for testing.

Because the parameters for training have been learned by referring to the non-objects for training, it will be efficient to determine the parameters for testing by using the parameters for training in case the ratio of the area of the specific non-object to the specific subsection is high. On the contrary, in case the ratio of the area of the specific non-object to the specific subsection is low, the specific non-object cannot represent the specific subsection so that it will not be inefficient to determine the parameters for testing by using the parameters for training. Thus, the first part of the specific parameter for testing is applied to the sub-region where the specific non-object for testing is located, and the second part of the specific parameter for testing is applied to sub-region where the specific object for testing is located.

After the parameters for testing are determined as shown above, the neural network operations may be applied to the test image. Herein, the neural network operations may be convolutional operations and deconvolutional operations. Accordingly, the computing device 100 may instruct the neural network 150 to generate the neural network outputs by applying the one or more convolutional operations and the one or more deconvolutional operations to the test image with the parameters for testing.

It is an advantage of the present disclosure to provide a method for determining the parameters for testing by using information on non-objects for training included in the subsections whose corresponding class information is same as or similar to that of the non-objects for testing to thereby generate the optimized neural network outputs.

By the method of the present disclosure, modes can be converted according to classes of areas to satisfy level 4 of autonomous vehicles.

The objects of the technical solution of the present disclosure or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present disclosure or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present disclosure and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variants equal or equivalent to the patent claims pertain to the category of the thought of the present disclosure.

What is claimed is:

1. A method for neural network operations by using a grid generator, comprising steps of:
    (a) a computing device, if a test image is acquired, instructing a non-object detector to acquire non-object location information for testing, including information on where non objects for testing are located on the test image, and class information of the non-objects for testing, including information on classes of the non-objects for testing, by detecting the non-objects for testing on the test image;
    (b) the computing device instructing the grid generator to generate section information, which includes information on a plurality of subsections in the test image, by referring to the non-object location information for testing;
    (c) the computing device instructing a neural network to determine parameters for testing, to be used for applying the neural network operations to either (i) at least part of the subsections including each of the objects for testing and each of non-objects for testing corresponding to said each of the objects for testing, or (ii) each of sub-regions, in each of said at least part of the subsections, where said each of the non-objects for testing is located, by referring to parameters for training which have been learned by using information on non-objects for training whose corresponding class information is same as or similar to that of the non-objects for testing; and
    (d) the computing device instructing the neural network to apply the neural network operations to the test image by using each of the parameters for testing, corresponding to each of said at least part of the subsections, to thereby generate one or more neural network outputs.

2. The method of claim 1, wherein, at the step of (b), the grid generator divides the test image by using a dynamic template, and wherein the dynamic template is provided by adjusting one or more boundaries included therein, such that at least one of the non-objects for testing is included in each of said at least part of the subsections of the dynamic template.

3. The method of claim 2, wherein the grid generator manages information on the dynamic template, and wherein the dynamic template includes at least part of (i) at least one first boundary in a first direction and (ii) at least one second boundary in a second direction, some of which are adjustable.

4. The method of claim 2, wherein the dynamic template includes row groups and one or more column groups, wherein the row groups have an upper row group, a middle row group including at least part of the column groups, and a lower row group, and wherein at least one of the non-objects for testing is included in each of said at least part of the subsections formed by the row groups and the column groups.

5. The method of claim 1, before the step (a), comprising a step of:
    (a0) the computing device instructing the neural network to learn the parameters for training by using information on each of the non-objects for training included in one or more training images.

6. The method of claim 5, wherein, at the step of (a0), the neural network learns the parameters for training by using information on each of the non-objects for training included in each of at least part of partial areas, from a first partial area to a k-th partial area, included in the training images, and store class information of the non-objects for training coupled with their corresponding parameters for training.

7. The method of claim 6, wherein, on condition that there are first location information to k-th location information corresponding to the first partial area to the k-th partial area in each of the training images, the training images, in which respective relative variations of at least part of the first location information to the k-th location information are equal to or smaller than a predetermined threshold value, are selected.

8. The method of claim 1, wherein, at the step of (c), (i) on condition that a ratio of an area of a specific object for testing to a specific subsection including the specific object for testing is smaller than a predetermined threshold value, the computing device instructs the neural network to determine at least one specific parameter for testing among the parameters for testing, to be used for applying the neural network operations to the specific subsection, by referring to at least one specific parameter for training among the parameters for training and (ii) on condition that the ratio of that is the same as or larger than the predetermined threshold value, the computing device instructs the neural network (ii-1) to determine a first part of the specific parameter for testing, to be used for applying the neural network operations to a sub-region, in the specific subsection, where a specific non-object for testing is located, by referring to the specific parameter for training among the parameters for training and (ii-2) to determine a second part of the specific parameter for testing, to be used for applying the neural network operations to a sub-region, in the specific subsection, where the specific object for testing is located, by referring to at least one additional parameter for training having been separately learned by using additional objects for training whose corresponding class information is the same as or similar to that of the specific object for testing.

9. The method of claim 1, wherein, at the step of (d), the computing device instructs the neural network to generate the neural network outputs by applying one or more convolutional operations and one or more deconvolutional operations to the test image with the parameters for testing.

10. The method of claim 9, wherein the test image represents road driving circumstances, the objects for testing represent objects existing on a road, and the neural network outputs are used for autonomous driving.

11. A computing device for neural network operations by using a grid generator, comprising:
at least one memory that stores instructions; and
at least one processor configured to execute the instructions to: perform processes of (I) instructing a non-object detector to acquire non-object location information for testing, including information on where non-objects for testing are located on a test image, and class information of the non-objects for testing, including information on classes of the non-objects for testing, by detecting the non-objects for testing on the test image, (II) instructing the grid generator to generate section information, which includes information on a plurality of subsections in the test image, by referring to the non-object location information for testing, (III) instructing a neural network to determine parameters for testing, to be used for applying the neural network operations to either (i) at least part of the subsections including each of the objects for testing and each of non-objects for testing corresponding to said each of the objects for testing, or (ii) each of sub-regions, in each of said at least part of the subsections where said each of the non-objects for testing is located, by referring to parameters for training which have been learned by using information on non-objects for training whose corresponding class information is same as or similar to that of the non-objects for testing, and (IV) instructing the neural network to apply the neural network operations to the test image by using each of the parameters for testing, corresponding to each of said at least part of the subsections, to thereby generate one or more neural network outputs.

12. The computing device of claim 11, wherein, at the process of (II), the grid generator divides the test image by using a dynamic template, and wherein the dynamic template is provided by adjusting one or more boundaries included therein, such that at least one of the non-objects for testing is included in each of said at least part of the subsections of the dynamic template.

13. The computing device of claim 12, wherein the grid generator manages information on the dynamic template, and wherein the dynamic template includes at least part of (i) at least one first boundary in a first direction and (ii) at least one second boundary in a second direction, some of which are adjustable.

14. The computing device of claim 12, wherein the dynamic template includes row groups and one or more column groups, wherein the row groups have an upper row group, a middle row group including at least part of the column groups, and a lower row group, and wherein at least one of the non-objects for testing is included in each of said at least part of the subsections formed by the row groups and the column groups.

15. The computing device of claim 11, before the process of (I), wherein the processor further performs a process of:
(0) instructing the neural network to learn the parameters for training by using information on each of the non-objects for training included in one or more training images.

16. The computing device of claim 15, wherein, at the process of (0), the neural network learns the parameters for training by using information on each of the non-objects for training included in each of at least part of partial areas, from a first partial area to a k-th partial area, included in the training images, and store class information of the non-objects for training coupled with their corresponding parameters for training.

17. The computing device of claim 16, wherein, on condition that there are first location information to k-th location information corresponding to the first partial area to the k-th partial area in each of the training images, the training images, in which respective relative variations of at least part of the first location information to the k-th location information are equal to or smaller than a predetermined threshold value, are selected.

18. The computing device of claim 11, wherein, at the process of (III), (i) on condition that a ratio of an area of a specific object for testing to a specific subsection including the specific object for testing is smaller than a predetermined threshold value, the processor instructs the neural network to determine at least one specific parameter for testing among the parameters for testing, to be used for applying the neural network operations to the specific subsection, by referring to at least one specific parameter for training among the parameters for training and (ii) on condition that the ratio of that is the same as or larger than the predetermined threshold value, the processor instructs the neural network (ii-1) to determine a first part of the specific parameter for testing, to be used for applying the neural network operations to a sub-region, in the specific subsection, where a specific non-object for testing is located, by referring to the specific parameter for training among the parameters for training and (ii-2) to determine a second part of the specific parameter for testing, to be used for applying the neural network operations to a sub-region, in the specific subsection, where the specific object for testing is located, by referring to at least one additional parameter for training having been separately learned by using additional objects for training whose corresponding class information is the same as or similar to that of the specific object for testing.

19. The computing device of claim 11, wherein, at the process of (IV), the processor instructs the neural network to generate the neural network outputs by applying one or more convolutional operations and one or more deconvolutional operations to the test image with the parameters for testing.

20. The computing device of claim 19, wherein the test image represents road driving circumstances, the objects for testing represent objects existing on a road, and the neural network outputs are used for autonomous driving.

* * * * *